(12) United States Patent
Chang et al.

(10) Patent No.: US 8,397,539 B2
(45) Date of Patent: Mar. 19, 2013

(54) NON-CONTACT DANCER MECHANISMS, WEB ISOLATION APPARATUSES AND METHODS FOR USING THE SAME

(75) Inventors: Chester H. H. Chang, Painted Post, NY (US); Kevin A Cole, Ontario, NY (US); Sean M. Garner, Elmira, NY (US); Gary E. Merz, Rochester, NY (US); Richard H. Weachock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 333 days.

(21) Appl. No.: 12/707,937

(22) Filed: Feb. 18, 2010

(65) Prior Publication Data

US 2011/0198378 A1 Aug. 18, 2011

(51) Int. Cl.
*C03B 13/00* (2006.01)
(52) U.S. Cl. .......... 65/245; 162/804; 162/813; 162/815; 162/193; 226/97.1; 226/97.3; 425/363; 425/367; 384/50; 65/370.1; 65/193; 65/196; 65/197; 65/198; 65/182.2; 65/25.2; 65/25.3; 65/25.4
(58) Field of Classification Search .............. 65/25.2, 65/182.2, 196, 197, 90, 370.1, 253–257, 65/125, 193, 198, 245; 384/53, 50; 425/363, 425/367, 366, 223; 226/97.1, 97.3; 162/193, 162/198, 199, 262, 272, 804, 813, 815; 198/813–816
See application file for complete search history.

(56) References Cited

U.S. PATENT DOCUMENTS

| 3,511,631 A | 5/1970 | Chaumont | 65/182 |
|---|---|---|---|
| 3,532,481 A | 10/1970 | Chaumont | 65/25 |
| 3,565,596 A | 2/1971 | McCown et al. | 65/182 |
| 3,573,026 A | 3/1971 | Maltby, Jr. et al. | 65/182 |
| 3,607,198 A | 9/1971 | Meunier et al. | 65/182 |
| 3,740,205 A * | 6/1973 | Cayphas et al. | 65/25.4 |
| 3,771,987 A | 11/1973 | Davis, Jr. et al. | 65/172 |
| 3,938,979 A | 2/1976 | Plumat | 65/90 |
| 4,359,178 A * | 11/1982 | Hayashi et al. | 226/25 |
| 4,385,716 A | 5/1983 | DeRoeck et al. | 226/18 |
| 4,656,096 A | 4/1987 | Geppaard | 428/426 |
| 5,876,474 A | 3/1999 | Maltby, Jr. et al. | 65/60.1 |
| 6,004,432 A | 12/1999 | Page et al. | 162/281 |
| 6,125,754 A | 10/2000 | Harris | 101/420 |
| 6,769,684 B2 | 8/2004 | Gandelheidt | 271/276 |
| 7,007,511 B2 | 3/2006 | Lautenschläger et al. | 65/25.3 |
| 7,107,792 B2 | 9/2006 | Langsdorf et al. | 65/25.2 |
| 7,337,633 B2 | 3/2008 | Shiraishi et al. | 65/25.2 |
| 2002/0142064 A1 | 10/2002 | Gandelheidt | 425/445 |
| 2006/0042314 A1 | 3/2006 | Abbott, III et al. | 65/25.3 |
| 2009/0101745 A1* | 4/2009 | St. Germain | 242/417.3 |
| 2009/0205373 A1* | 8/2009 | Kojima et al. | 65/90 |

\* cited by examiner

*Primary Examiner* — Jason L Lazorcik
*Assistant Examiner* — Yana Belyaev
(74) *Attorney, Agent, or Firm* — Kevin M. Able

(57) ABSTRACT

A non-contact dancer mechanism for conveying a web of brittle material includes a guide rail and a variable position web support plenum adjustably positioned on the guide rail. The variable position web support plenum may include an arcuate outer surface with a plurality of fluid vents for emitting a fluid to support the web of brittle material over and spaced apart from the arcuate outer surface thereby preventing mechanical contact and damage to the web of brittle material. A support plenum counterbalance may be mechanically coupled to the variable position web support plenum, wherein the support plenum counterbalance supports at least a portion of the weight of the variable position web support plenum on the guide rail. Apparatuses incorporating the non-contact dancer mechanism and methods for using the non-contact dancer mechanism for handling continuous webs of brittle material are also disclosed.

11 Claims, 4 Drawing Sheets

NON-CONTACT DANCER MECHANISMS, WEB ISOLATION APPARATUSES AND METHODS FOR USING THE SAME

BACKGROUND

1. Field

The present specification generally relates to the manufacture and processing of webs of brittle material and, more specifically, to apparatuses with non-contact dancer mechanisms and methods for using the same to convey webs of brittle material.

2. Technical Background

Thin glass ribbons may be formed by processes such as the fusion process or other, similar downdraw processes. Such thin glass ribbons can be used in a variety of devices including flat panel displays, touch sensors, photovoltaic devices and other electronic applications. The fusion process yields thin glass ribbons which have surfaces with superior flatness and smoothness when compared to glass ribbons produced by other methods.

In the fusion process, a fusion draw machine (FDM) is used to form a glass ribbon and stretch the glass ribbon to a desired thickness by drawing the glass ribbon between two sets of rolls. For example, the fusion draw process may be used to draw the glass ribbon to a thickness at which the glass is flexible. The flexibility of the thin glass ribbon makes it possible to spool the glass ribbon onto a storage spindle and, as such, permits the glass to be produced and processed (i.e., laminated, coated, etc.) as a continuous web.

Uncoated thin glass ribbons are particularly susceptible to damage by mechanical contact prior to being laminated or coated with a protective film. Accordingly, mechanical contact with the uncoated thin glass ribbon should be avoided prior to application of the protective film. Furthermore, processes downstream of the FDM may influence the draw process and vice-versa. For example, mechanical vibrations introduced during spooling or lamination may propagate upstream and adversely influence the draw process. Similarly, the draw speed of the FDM and the speed of downstream processes such as winding and laminating should be precisely controlled such that the speeds are approximately equal to avoid introducing excess tension in the glass and/or introducing slack in the glass ribbon, such as when a portion of the glass ribbon is not supported by a roller or another support apparatus. However, such precise control and synchronization of multiple processes is often difficult to achieve.

Accordingly, a need exists for alternative, mechanisms conveying a web of brittle material, such as thin glass, from an upstream process to a downstream process during the manufacture and processing of webs of brittle material.

SUMMARY

According to one embodiment, a non-contact dancer mechanism for conveying a web of brittle material includes a guide rail and a variable position web support plenum adjustably positioned on the guide rail. The variable position web support plenum may include an arcuate outer surface with a plurality of fluid vents for emitting a fluid to support the web of brittle material over and spaced apart from the arcuate outer surface thereby preventing mechanical contact and damage to the web of brittle material. A support plenum counterbalance may be mechanically coupled to the variable position web support plenum, wherein the support plenum counterbalance supports at least a portion of the weight of the variable position web support plenum on the guide rail.

In another embodiment, an apparatus for isolating upstream and downstream processes from one another while processing a web of brittle material may include a fixed position web support plenum and a variable position web support plenum. The fixed position web support plenum may include an arcuate outer surface with a plurality of fluid vents for emitting a fluid. The variable position web support plenum may be adjustably positioned on a guide rail and mechanically coupled to a support plenum counterbalance. The variable position web support plenum may also include an arcuate outer surface with a plurality of fluid vents for emitting a fluid. The fixed position web support plenum redirects the web of brittle material from an initial pathway to a first pathway along which the variable position web support plenum is positioned as the web of brittle material is supported over and spaced apart from the arcuate outer surface of the fixed position web support plenum thereby preventing mechanical contact and damage to the web of brittle material. The variable position web support plenum redirects the web of brittle material from the first pathway to a second pathway as the web of brittle material is supported over and spaced apart from the arcuate outer surface of the variable position web support plenum thereby preventing mechanical contact and damage to the web of brittle material. A position of the variable position web support plenum on the guide rail may be passively adjusted based on a process variable of the upstream process, a process variable of the downstream process or process variables of both the upstream process and the downstream process to reduce slack in the web.

In yet another embodiment, a method for isolating an upstream process from a downstream process while processing a web of brittle material may include conveying the web of brittle material along a first pathway and directing the web of brittle material over the arcuate outer surface of a variable position web support plenum slidably positioned on a guide rail. The web of brittle material may be supported over and spaced apart from the arcuate outer surface of the variable position web support plenum and redirected from the first pathway to a second pathway, wherein changes in the upstream process, the downstream process or both vary the displacement of the variable position web support plenum on the guide rail. A displacement of the variable position web support plenum on the guide rail may be determined and a process parameter of the upstream process, the downstream process, or both may be adjusted based on the displacement of the variable position web support plenum on the guide rail to adjust the length of the web of brittle material thereby adjusting the length of the web between the upstream and downstream processes and isolating the upstream process from the downstream process.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
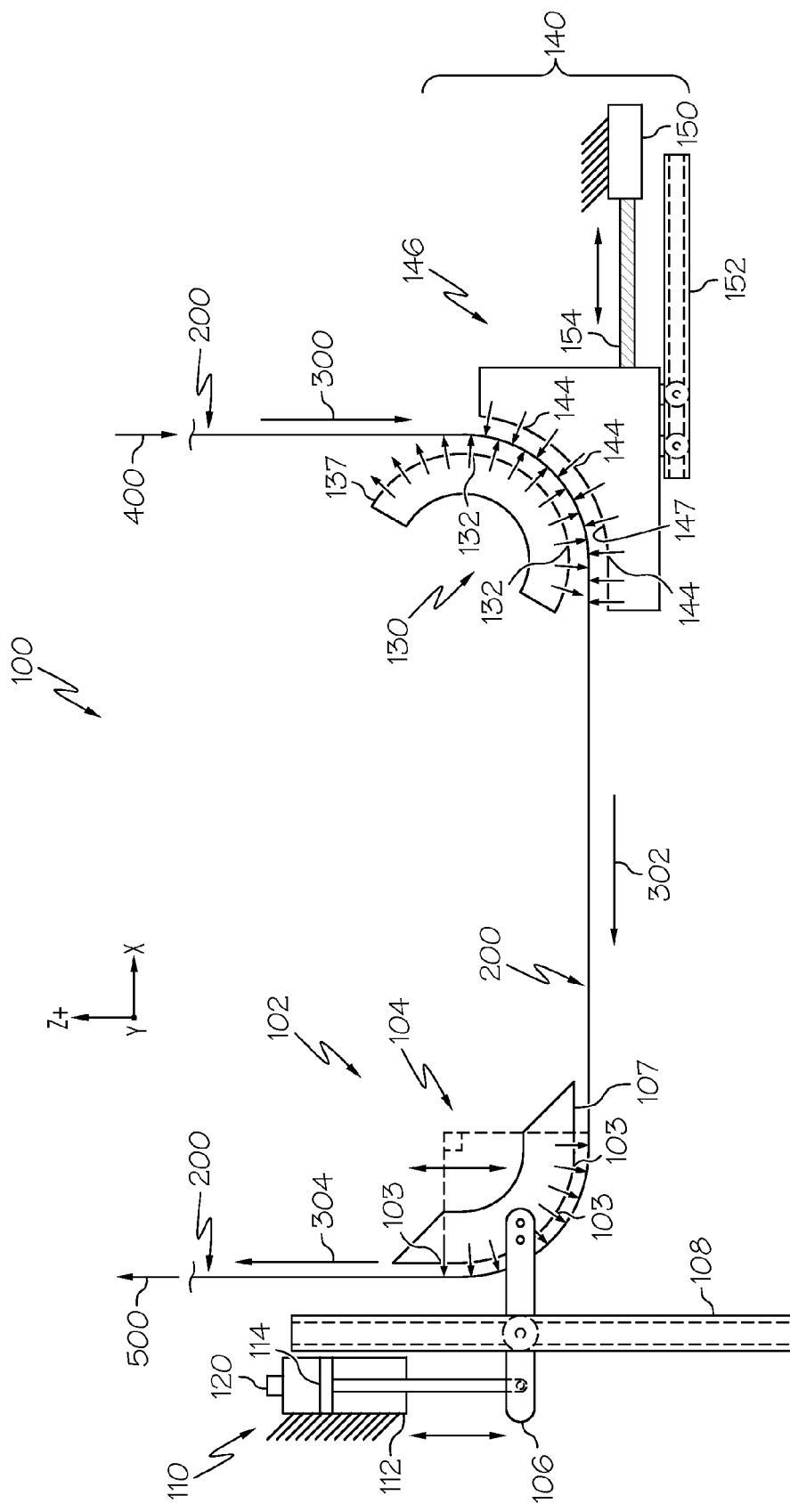
FIG. 1 schematically depicts a cross section of a web isolation apparatus which includes a non-contact dancer mechanism according to one or more embodiments shown and described herein.

Reference will now be made in detail to various embodiments of web isolation apparatuses, examples of which are illustrated in the accompanying drawings. Whenever possible, the same reference numerals will be used throughout the drawings to refer to the same or like parts. One embodiment of a web isolation apparatus is schematically depicted in FIG. 1. The web isolation apparatus generally includes a fixed position web support plenum and a non-contact dancer mechanism. The non-contact dancer mechanism redirects a web of brittle material from a first pathway to a second pathway thereby isolating upstream and downstream processes from one another. This redirection reduces the impact of process rate differences in the upstream and downstream processes. One or more process parameters of the upstream process and/or the downstream process may also be adjusted based on the position of the non-contact dancer mechanism. Various components of the web isolation systems and the operation of the web isolation systems will be described in further detail herein with specific reference to the drawings.

Referring now to FIG. 1, a web isolation apparatus 100 is depicted according to one embodiment described herein. The web isolation apparatus 100 generally comprises a non-contact dancer mechanism 102 and a fixed position web support plenum 130. In the embodiment shown in FIG. 1, the web isolation apparatus 100 also includes a threading support plenum 140 which, in the embodiment shown in FIG. 1, is used in cooperation with the fixed position web support plenum 130 during initial thread-up of the system.

Still referring to FIG. 1, the non-contact dancer mechanism 102 generally comprises a variable position web support plenum 104, at least one guide rail 108 and a support plenum counterbalance 110. The variable position web support plenum 104 generally comprises an arcuate outer surface 107. For example, in the embodiment shown in FIG. 1, the variable position web support plenum 104 has an arcuate outer surface 107 which forms an arc through approximately 90 degrees. Accordingly, in this embodiment, the variable position web support plenum 104 is configured such that when a web of brittle material 200 is directed over the arcuate outer surface 107, the web of brittle material is redirected by 90 degrees or less.

While the embodiment of the variable position web support plenum 104 illustrated in FIG. 1 comprises an arcuate outer surface 107 which forms an arc through approximately 90 degrees, it should be understood that in other embodiments the arcuate outer surface 107 may form an arc of 360 degrees or less. Further, the arcuate outer surface may have a constant radius of curvature, such as when a cross section of the arcuate outer surface is a circle or a portion of a circle. Alternatively, the radius of curvature of the arcuate outer surface may vary, such as when the arcuate outer surface is parabolic in cross section.

The variable position web support plenum 104 is coupled to a fluid source (not shown) with a conduit or other suitable fluid supply line such that a pressurized fluid is supplied to an internal volume of the variable position web support plenum 104. The arcuate outer surface 107 of the variable position web support plenum 104 includes a plurality of fluid vents 103 through which the pressurized fluid is emitted. When a web of brittle material 200 is directed over the arcuate outer surface 107 the pressurized fluid forms a fluid cushion between the web of brittle material and the arcuate outer surface 107 such that the web of brittle material is supported over and spaced apart from the arcuate outer surface. The resultant fluid cushion prevents mechanical contact with the web of brittle material and mitigates damage to the web of brittle material.

In the embodiments described herein the pressurized fluid is air. The air is supplied to the internal volume of the variable position web support plenum 104 with a blower (not shown). However, it should be understood that, in the alternative, the pressurized fluid may comprise a single gas or various mixtures of gases. Further, it should be understood that the fluid may be supplied to the variable position web support plenum with a compressor or other source of pressurized gas.

While FIG. 1 depicts a side-view of the non-contact dancer mechanism 102, it should be understood that the arcuate outer surface 107 of the variable position web support plenum 104 has a width extending in the y-direction at least as wide as the width of the web of brittle material 200 directed over the arcuate outer surface 107 of the variable position web support plenum 104. In the embodiments described herein the web of brittle material 200 may have a width from about 2.5 cm to about 125 cm and, as such, the width of the arcuate outer surface 107 is at least 2.5 cm. However, it should be understood that the width of the arcuate outer surface 107 may be larger or smaller.

Still referring to FIG. 1, the variable position web support plenum 104 is slidably positioned on the guide rail 108 such that the variable position web support plenum 104 is free to slide relative to the guide rail 108. In the embodiment shown in FIG. 1, the variable position web support plenum 104 is mounted on a carriage 106 which, in turn, is slidably positioned on the guide rail 108. However, it should be understood that the variable position web support plenum 104 may be directly slidably positioned in the guide rail 108 without the carriage 106. The guide rail 108 generally comprises a track or other suitable structure along which the variable position web support plenum 104 may be slidably displaced. For example, the guide rail 108 may include a plurality of bearings, rollers and/or linear slides which facilitate slidably positioning the carriage 106 and/or the variable position web support plenum 104 in the guide rail. In one embodiment the guide rail 108 may comprise a Precision Profile Rail System manufactured by Nook Industries of Cleveland, Ohio. The carriage 106 and variable position web support plenum 104 may be coupled to low friction slides attached to the guide rail 108 such that the carriage 106 and variable position web support plenum 104 are slidably positioned on the guide rail 108.

In the embodiment of the web isolation apparatus shown in FIG. 1 the guide rail 108 of the non-contact dancer mechanism 102 is substantially vertically oriented (i.e., the guide rail 108 is oriented in the z-direction of the coordinate axes shown in FIG. 1). However, it should be understood that in other embodiments the guide rail 108 may be oriented at an angle with respect to vertical. In an alternative embodiment (not shown), the variable position web support plenum can be mounted to a mechanism which rotates the variable position web support plenum.

As shown in FIG. 1, the non-contact dancer mechanism 102 further comprises a support plenum counterbalance 110. The support plenum counterbalance 110 is mechanically coupled to the variable position web support plenum 104 such that the support plenum counterbalance 110 supports at least a portion of the weight of the variable position web support plenum on the guide rail and thereby maintains the position of the variable position web support plenum 104 relative to the guide rail 108 and minimizes the force exerted by the variable position web support plenum 104 on the web of brittle material 200. For example, in the embodiment shown in FIG. 1, the support plenum counterbalance 110 is mechanically coupled to the carriage 106 which, in turn, is mechanically coupled to the variable position web support plenum 104. However, it should be understood that the support plenum counterbalance 110 may be directly coupled to the variable position web support plenum 104. To support the weight of the variable position web support plenum 104, the support plenum counterbalance 110 is also mechanically grounded relative to the variable position web support plenum 104. For example, the support plenum counterbalance 110 may be fixed to the guide rail 108 or another, similar support structure which is fixed relative to the variable position web support plenum 104.

In the embodiments of the non-contact dancer mechanism 102 shown and described herein, the support plenum counterbalance 110 is an air cylinder comprising a piston 114 slidably disposed in a housing 112. The piston 114 is mechanically coupled to the carriage 106 and the variable position web support plenum 104. For example, the support plenum counterbalance 110 may be an Airpel M32D100.OU air cylinder manufactured by the Airpot Corporation of Norwalk, Conn. As the variable position web support plenum 104 moves along the guide rail 108, the support plenum counterbalance applies a force to the variable position web support plenum 104 such that the tension generated in the web of brittle material 200 with the variable position web support plenum 104 is constant irrespective of the position of the variable position web support plenum 104 which, in turn, minimizes disturbances in the upstream and downstream processes due to changes in the tension in the web of brittle material. The amount of lifting force generated by the support plenum counterbalance may be adjusted. For example, when the support plenum counter balance 110 is an air cylinder as described above, the amount of lifting force generated by the support plenum counterbalance 110 may be adjusted by changing the air pressure in the air cylinder. In one embodiment, the force exerted by the support plenum counterbalance 110 may be slightly less than the combined weight of the variable position web support plenum 104, the carriage 106 and the piston 114.

While the support plenum counterbalance 110 has been shown and described herein as comprising an air cylinder, it should be understood that other mechanisms suitable for supporting at least a portion of the weight of the variable position web support plenum 104 may be used for the support plenum counterbalance 110. For example, in the alternative, the support plenum counterbalance may comprise a hydraulic cylinder, springs, and/or weights mechanically coupled to the variable position web support plenum 104.

Still referring to FIG. 1, the non-contact dancer mechanism 102 may further comprise a displacement sensor 120 for determining the displacement of the variable position web support plenum 104 along the guide rail 108. For example, when the support plenum counterbalance 110 is an air cylinder, as shown in FIG. 1, the air cylinder may comprise a linear displacement sensor, such as an optical sensor, an ultrasonic sensor, an inductive displacement sensor, a magnetorestrictive linear position transducer or a similar displacement sensor which is operable to detect the position of the piston 114 relative to the housing 112. Thus, the displacement of the variable position web support plenum 104 relative to the guide rail 108 can be determined In other embodiments (not shown) the displacement sensor may be associatively coupled to the variable position web support plenum 104 and/or the guide rail 108 and operable to determine a position of the variable position web support plenum relative to the guide rail 108.

In addition to the non-contact dancer mechanism 102 the web isolation apparatus 100 may further comprise a fixed position web support plenum 130. The fixed position web support plenum 130 may be mechanically coupled to a fixed support (not shown). The fixed position web support plenum 130 is positioned such that the web of brittle material 200 may be redirected by the fixed position web support plenum 130 from an initial pathway 300 to a first pathway 302, along which the variable position web support plenum is located.

As described herein with respect to the variable position web support plenum 104, the fixed position web support plenum 130 generally comprises an arcuate outer surface 137. For example, in the embodiment shown in FIG. 1, the fixed position web support plenum 130 has an arcuate outer surface 137 forming an arc through approximately 180 degrees. Accordingly, in this embodiment the variable position web support plenum 104 is configured such that when a web of brittle material is directed over the arcuate outer surface 107, the web of brittle material may be redirected by 180 degrees or less. However, it should be understood that the arc of the arcuate outer surface 137 may be greater than or less than 180 degrees. Further, the arcuate outer surface 137 may have a constant radius of curvature, such as when a cross section of the arcuate outer surface is a circle or a portion of a circle. Alternatively, the radius of curvature of the arcuate outer surface may vary, such as when the arcuate outer surface is parabolic in cross section.

The fixed position web support plenum 130 is coupled to a fluid source (not shown) with a conduit or other suitable fluid supply line such that pressurized fluid is supplied to an internal volume of the fixed position web support plenum 130 and emitted through fluid vents 132 in the arcuate outer surface 137. When a web of brittle material 200 is directed over the arcuate outer surface 137 of the fixed position web support plenum 130 the pressurized fluid forms a fluid cushion between the web of brittle material 200 and the arcuate outer surface 137. The web of brittle material 200 is supported over and spaced apart from the arcuate outer surface 137 by the fluid cushion thereby preventing mechanical contact with the web of brittle material 200 and mitigating damage to the web of brittle material 200.

In the embodiment of the web isolation apparatus 100 shown in FIG. 1, the web isolation apparatus 100 further comprises a web threading support 140 which is adjustably positioned relative to the fixed position web support plenum 130. The web threading support 140 generally comprises a threading support plenum 146 with a web support surface 147. The threading support plenum 146 is coupled to a fluid source such that fluid is emitted through fluid vents 144 in the web support surface 147. At least a portion of the web support surface 147 has a radius of curvature which is complimentary to a radius of curvature of the arcuate outer surface 137 of the fixed position web support plenum 130. The threading support plenum 146 is mechanically coupled to an actuator 150 which enables the threading support plenum to be adjustably positioned relative to the fixed position web support plenum 130. In the embodiment shown in FIG. 1, the actuator 150 comprises an electric motor coupled to the threading support plenum 146 with a worm gear 154. However, it should be understood that other types and/or configurations of actuators may be used to facilitate positioning the threading support plenum relative to the fixed position web support plenum 130. In the embodiment shown in FIG. 1, the threading support plenum 146 is slidably positioned on a track 152 such that when the actuator 150 is activated the position of the threading support plenum on the track 152 is adjusted relative to the fixed position web support plenum 130.

Figure 3:
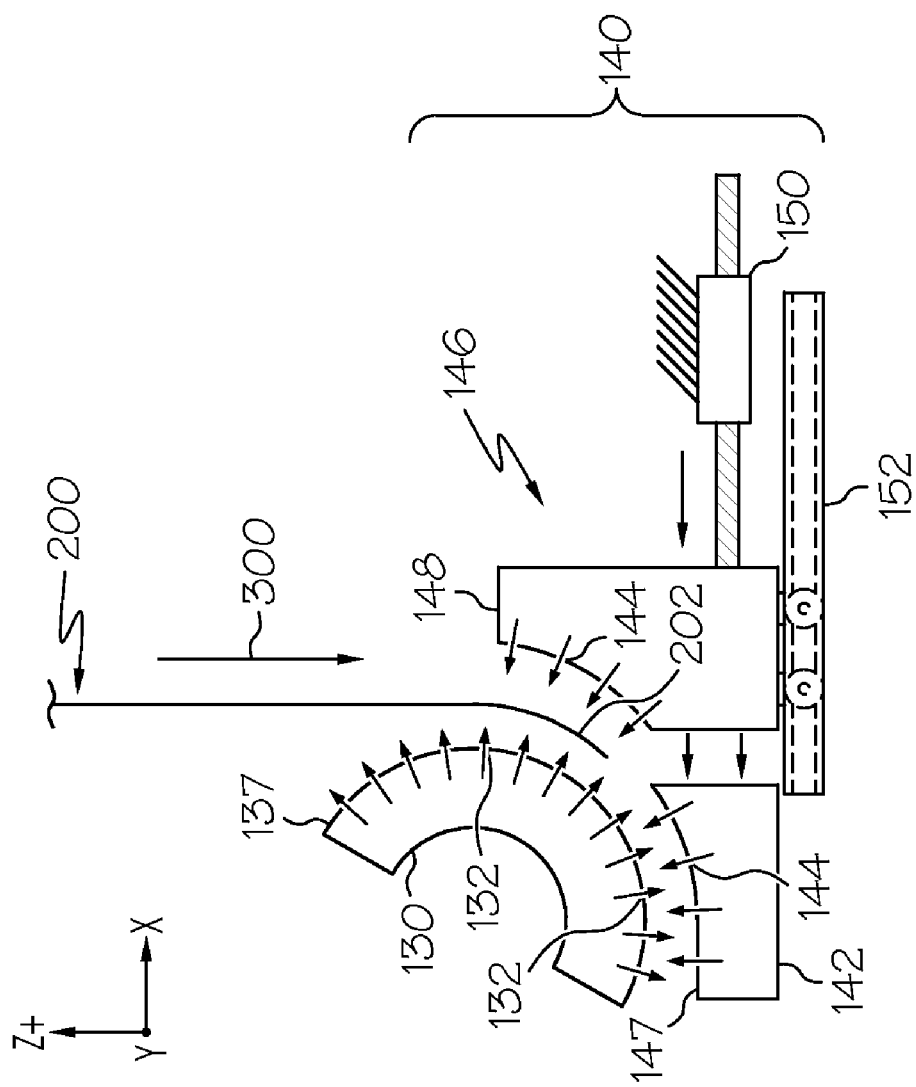
FIG. 3 schematically depicts a portion of web isolation apparatus illustrating a web threading support used in conjunction with a fixed position web support plenum according to one or more embodiments shown and described herein.

Referring to FIG. 3, an alternative embodiment of the threading support plenum 146 is schematically illustrated. In this embodiment, the threading support plenum is formed from a web flotation table 142 and a web support shuttle 148. The air flotation table 142 may be positioned proximate the arcuate outer surface 137 of the fixed position web support plenum 130 such that the web of brittle material may be threaded between the air flotation table 142 and the fixed position web support plenum 130. The web support shuttle 148 is mechanically coupled to the actuator 150 such that the position of the web support shuttle 148 may be adjusted along the track 152 relative to both the air flotation table 142 and the fixed position web support plenum 130. In this embodiment, both the air flotation table 142 and the web support shuttle 148 may be fluidly coupled to a fluid source such that fluid is emitted through fluid vents 144.

In the embodiments of the web threading support 140 depicted in FIGS. 1 and 3 the web threading support may be used to initially direct the web of brittle material 200 around the arcuate outer surface 137 of the fixed position web support plenum 130 such that the web of brittle material may be directed from an upstream process 400 to a downstream process 500. Specifically, by varying the position of the threading support plenum 146 relative to the fixed position web support plenum 130, the web of brittle material may be redirected from an initial pathway 300, which, in the embodiments shown in FIGS. 1 and 3, is substantially vertical, to a first pathway 302 which, in the embodiments shown, is substantially horizontal, as the web of brittle material is supported on both surfaces by a cushion of air. This facilitates curving the web of brittle material around the arcuate outer surface 137 of the fixed position web support plenum 130 with minimal mechanical contact.

Figure 2:
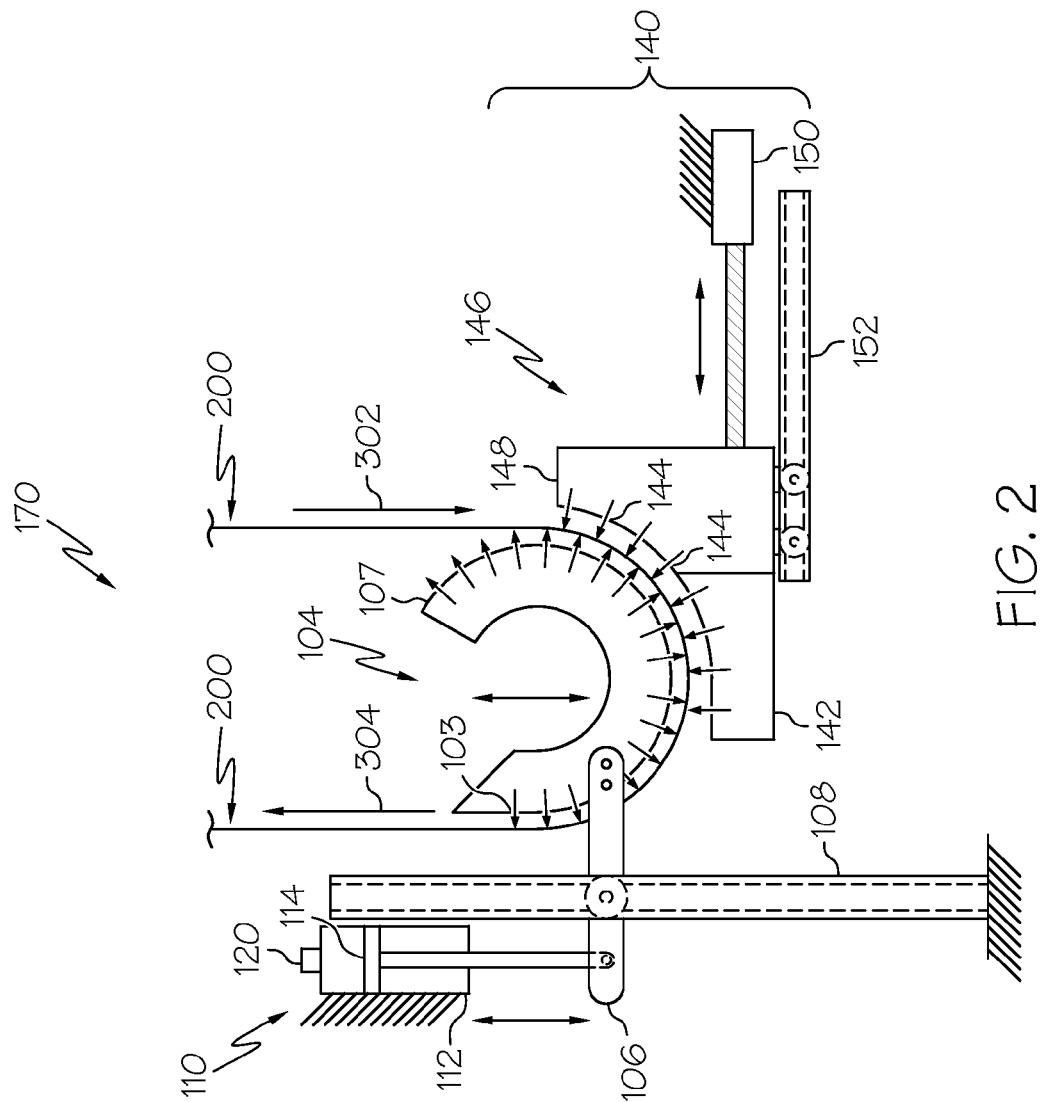
FIG. 2 schematically depicts a cross section of a non-contact dancer mechanism which comprises a variable position web support plenum with a web threading support according to one or more embodiments shown and described herein.

Further, while the web threading support 140 is shown in FIG. 1 as being used in conjunction with the fixed position web support plenum 130, it should be understood that the web threading support 140 may also be used in conjunction with the non-contact dancer mechanism as shown in FIG. 2. More specifically, in the embodiment of the non-contact dancer mechanism 170 shown in FIG. 2, the non-contact dancer mechanism 170 further comprises a web threading support 140 similar to that depicted in FIGS. 1 and 3 to facilitate initially directing a web of brittle material over the arcuate outer surface 107 of the variable position web support plenum 104.

Methods of using the web isolation apparatus 100 will now be described with specific reference to FIGS. 1, 3 and 4A-4B.

In an initial step, a web of brittle material 200 is drawn from an upstream process 400 along an initial pathway 300. In the embodiments described herein the web of brittle material 200 is a thin glass ribbon and the upstream process 400 is a glass forming process such as a fusion draw process. The thin glass ribbon has a thickness of less than about 700 microns, more preferably, a thickness from about 10 microns to about 300 microns and, most preferably, a thickness from about 30 microns to about 100 microns. In one embodiment, the thin glass ribbon may have a coating, such as a continuous or patterned coating, applied to a surface or edge thereof. The initial pathway 300 over which the web of brittle material 200 is drawn is substantially vertically oriented (i.e., in the direction of the z-axis of the coordinate system shown in FIG. 1). During startup of the draw process, the dimensions of the thin glass ribbon may initially vary. Accordingly, until acceptable dimensions of the thin glass ribbon are achieved, the web threading support 140 is withdrawn from beneath the fixed position web support plenum and the thin glass ribbon is directed into a waste glass chute (not shown) lying along the initial pathway 300.

Once suitable dimensions have been obtained, the leading edge 202 of the web is deflected from the initial pathway 300 to the first pathway 302 with the web threading support 140. More specifically, as the web of brittle material 200 is drawn downward, the web support shuttle 148 of the web threading support 140 is moved into position proximate the arcuate outer surface 137 of the fixed position web support plenum 130 with the actuator 150. As the web support shuttle 148 is moved into position, the fluid emitted from the fluid vents 144 deflects the web of brittle material towards the arcuate outer surface 137 of the fixed position web support plenum 130. Simultaneously, the fluid emitted from the fluid vents 132 in the arcuate outer surface 137 is impinged against the surface of the web of brittle material 200 such that the web is prevented from contacting the arcuate outer surface 137. An equilibrium between the fluid emitted from the fixed position web support plenum 130 and the fluid emitted from the web threading support 140 is reached such that the web of brittle material is supported over and spaced apart from both the arcuate outer surface 137 of the fixed position web support plenum 130 and the web support surface 147 of the web threading support 140.

Once the web has been redirected from the initial pathway 300 to the first pathway 302, an operator may manually thread the web of brittle material 200 over the arcuate outer surface 107 of the variable position web support plenum 104 of the non-contact dancer mechanism 102 such that the web of brittle material 200 is redirected from the first pathway 302 to a second pathway 304 non-parallel with the first pathway. As the web is directed over the arcuate outer surface 107, fluid from the fluid vents 103 prevents the web of brittle material 200 from contacting the variable position web support plenum 104. As depicted in FIG. 1, the web of brittle material 200 is drawn along the second pathway 304 to a downstream process 500 which, in the embodiments described herein, may comprise laminating and/or winding the web of brittle material 200.

Once the web of brittle material has been threaded through the web isolation apparatus 100, the web threading support 140 may be removed. Thereafter, the web isolation apparatus may be utilized to adjust the length of travel of the web between the upstream and downstream processes as well as to isolate upstream processes 400 from downstream processes 500. Specifically, as the web of brittle material 200 is directed through the web isolation apparatus 100, the variable position web support plenum is free to move along the guide rail 108.

For example, when the rate at which the web of brittle material 200 is paid out from the upstream process 400 is approximately equal to the rate at which the web of brittle material 200 is taken up by the downstream process 500, the variable position web support plenum is at neutral position on the guide rail 108 as schematically depicted in FIG. 1. In this position, the tension in the web is in equilibrium with the net weight of the variable position web support plenum 104 (i.e., the weight of the variable position web support plenum 104 less the force applied to the variable position web support plenum 104 by the support plenum counterbalance 110) acting on the web such that the position of the variable position web support plenum 104 remains in a nominal position. As described above, the support plenum counterbalance 110 applies a force nearly equal in magnitude but opposite in direction to the weight of the variable position web support plenum 104 such that a nominal amount of tension applied to the web or brittle material 200 is sufficient to maintain the position of the variable position web support plenum 104 on the guide rail 108. Furthermore, the tension applied to the web by the non-contact dancer mechanism 102 aids in damping vibrations from the downstream processes 500 and mitigates such vibrations from traveling through the web towards the upstream processes 400.

Figure 4A:
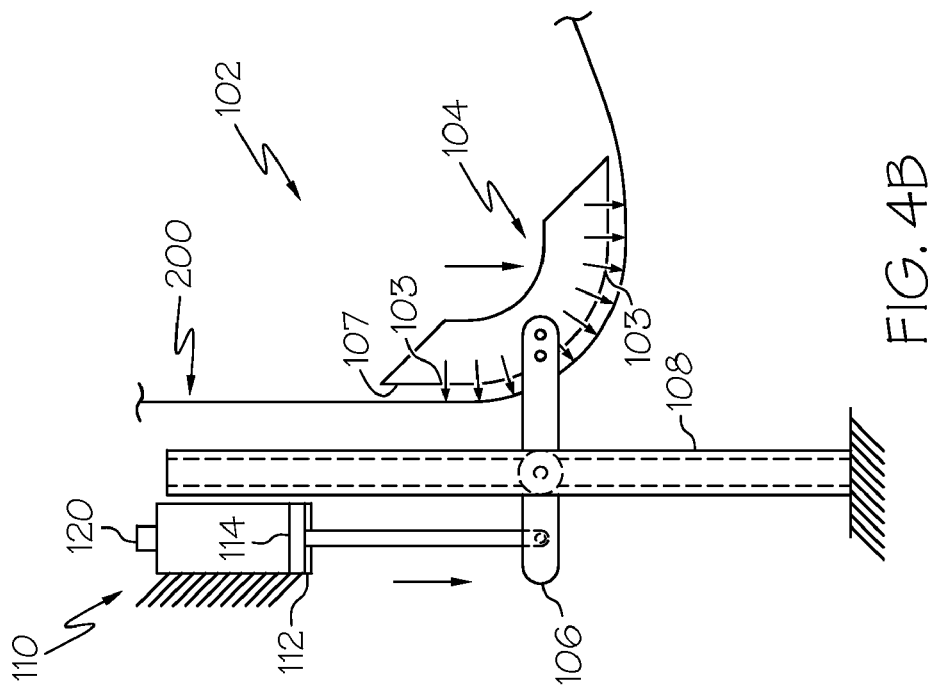
FIGS. 4A and 4B schematically depict the operation of a non-contact dancer mechanism to isolate and balance upstream and downstream processes during the manufacture of a continuous web of laminated glass according to one or more embodiments shown and described herein.

However, when the rate at which the web of brittle material 200 is paid-out by the upstream process 400 and the rate at which the web of brittle material 200 is taken up by the downstream process 500 are different, the position of the variable position web support plenum 104 is passively adjusted to account for the different take-up and pay-out rates. For example, FIG. 4A depicts the position of the variable position web support plenum 104 of the non-contact dancer mechanism 102 when the take-up rate of the downstream process 500 is greater than the pay-out rate of the upstream process 400. As shown in FIG. 4A, when the take-up rate of the downstream process 500 is greater than the pay-out rate of the upstream process 400, the variable position web support plenum 104 moves upward (i.e., in the positive z-direction) on the guide rail 108 thereby decreasing the length of travel of the web of brittle material 200 between the upstream and downstream processes. This upward movement increases the amount of tension in the web due to the disparity in the take-up rate and pay-out rate of the upstream and downstream processes.

Specifically, when the take-up rate of the downstream process 500 is greater than the pay-out rate of the up-stream process, the web of brittle material 200 exerts a greater force on the variable position web support plenum 104 and causes the variable position web support plenum to move upwards (i.e., in the positive z-direction). However, it should be understood that, as the web exerts a force on the variable position web support plenum 104, the fluid cushion between the arcuate outer surface 107 of the variable position web support plenum 104 prevents the web of brittle material 200 from contacting the arcuate outer surface 107.

Figure 4B:
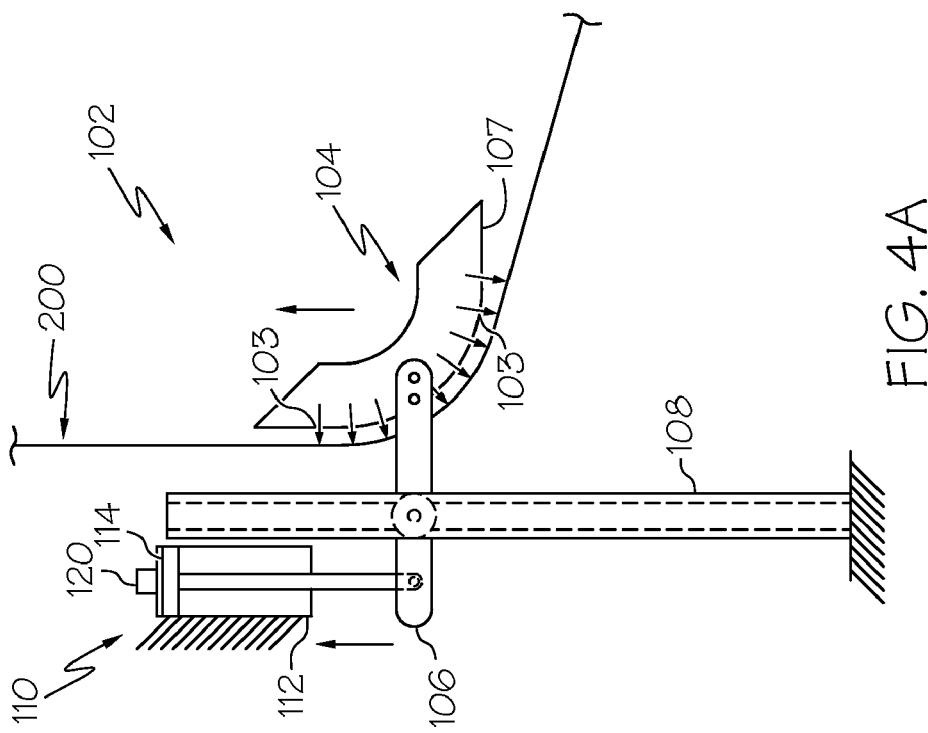

FIG. 4B depicts the position of the variable position web support plenum 104 when the take-up rate of the downstream process 500 is less than the pay-out rate of the upstream process 400. As shown in FIG. 4B, when the take-up rate of the downstream process 500 is less than the pay-out rate of the upstream process 400, slack in the web of brittle material 200 along the initial pathway 300 and the first pathway 302 is prevented as the variable position web support plenum 104 moves downward (i.e., in the negative z-direction) on the guide rail 108. This downward movement increases the length of travel of the web of brittle material 200 between the upstream and downstream processes.

Specifically, when the take-up rate of the downstream process is less than the pay-out rate of the up-stream process the length of travel of the web of brittle material 200 increases between the upstream process and the downstream process. To maintain the net force acting on the web of brittle material, the variable position web support plenum 104 moves downwards (i.e., in the negative z-direction) to maintain proximity with the web. In this manner, the vector sum of the force of gravity acting on the variable position web support plenum 104, the force applied by the support plenum counterbalance 110, and the force applied to the variable position web support plenum 104 due to the tension in the web of brittle material 200 is zero and the variable position web support plenum 104 achieves an equilibrium position on the guide rail 108.

While the web isolation apparatus 100 may be used to passively reduce slack in a web of brittle material 200, it should be understood that the web isolation apparatus 100 may also be used to actively maintain a nearly constant length of the web of brittle material 200 between the upstream and downstream processes by controlling a process variable of the downstream process, a process variable of an upstream process, or process variables of both the upstream process and the downstream process. For example, when the non-contact dancer mechanism 102 comprises a displacement sensor 120 for measuring displacement of the variable position web support plenum 104 on the guide rail 108, the output of the displacement sensor may be used to adjust process variables of the upstream and downstream processes, such as the rates of the upstream and downstream processes, to maintain the length of travel of the web of brittle material between the upstream and downstream processes and thereby prevent slack in the web. Initially, a nominal position of the variable position web support plenum 104 on the guide rail 108 may be determined. In one embodiment, the nominal position of the variable position web support plenum 104 is the position where the web of brittle material 200 is horizontal as the web traverses the first pathway 302.

Thereafter, the position of the variable position web support plenum 104 is determined with the displacement sensor 120 and the output signal of the displacement sensor 120 is transmitted to a control unit (not shown). The control unit is programmed to adjust the pay-out rate of the upstream process, the take-up rate of the downstream process, or both depending on the measured position of the variable position web support plenum 104. For example, in one embodiment the control unit is programmed with a look-up table containing rates for the upstream process and the downstream process necessary to restore the variable position web support plenum to the nominal position. In this embodiment the pay-out rates of the upstream process and the take-up rates of the downstream process are indexed according to the displacement of the variable position web support plenum 104 on the guide rail 108. Based on the displacement of the variable position web support plenum 104, the control unit is programmed to determine the corresponding up-take and pay-out rates for the upstream and downstream processes to restore the variable position web support plenum 104 to the nominal position. Thereafter, the control unit sends control signals to upstream and downstream processes to adjust the rates of the upstream and downstream processes accordingly.

In another embodiment, the control unit is programmed to determine the position of the variable position web support plenum 104 on the guide rail 108 based on the output of the displacement sensor 120. When the position of the variable position web support plenum 104 is lower than the nominal position, the control unit is programmed to increase the take-up rate of the downstream process and/or decrease the payout rate of the upstream process to return the variable position web support plenum 104 to the nominal position by sending control signals to the upstream process and/or the downstream process. Alternatively, when the position of the variable position web support plenum 104 is higher than the nominal position, the control unit is programmed to decrease the take-up rate of the downstream process and/or increase the pay-out rate of the upstream process to return the variable position web support plenum 104 to the nominal position by sending control signals to the upstream process and/or the downstream process.

It should now be understood that the non-contact dancer mechanisms and web isolation apparatuses incorporating the same may be used in web manufacturing and processing operations to isolate upstream and downstream processes from one another. More specifically, by redirecting the web of continuous material from an initial pathway to one or more additional pathways, the web isolation apparatus isolates mechanical vibrations from downstream processes from propagating upstream and vice-versa. Moreover, the non-contact dancer mechanism is capable of compensating for differences in the take-up rate of the downstream process and the payout rate of the upstream process without mechanically contacting the web thereby preventing damage to the web.

While non-contact dancer mechanisms and web isolation apparatuses using the same have been described herein as being used in conjunction with the manufacture and processing of thin glass webs, it should be understood that the non-contact dancer mechanism and web isolation apparatuses may be used in conjunction with other types of web materials including, without limitation, polymer materials and fibrous webs of material such as paper.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A non-contact dancer mechanism for conveying a web of brittle material, the non-contact dancer mechanism comprising:
    a guide rail;
    a variable position web support plenum slidably positioned on the guide rail, wherein the variable position web support plenum comprises an arcuate outer surface with a plurality of fluid vents for emitting a fluid to support the web of brittle material over and spaced apart from the arcuate outer surface thereby preventing mechanical contact and damage to the web of brittle material; and
    a support plenum counterbalance mechanically coupled to and passively supporting the variable position web support plenum such that the variable position web support plenum is free to slide relative to the guide rail and the support plenum counterbalance exerts a force on the variable position web support plenum such that a tension on the web of brittle material is constant irrespective of the position of the variable position web support plenum on the guide rail.

2. The non-contact dancer mechanism of claim 1, wherein the support plenum counterbalance comprises an air cylinder.

3. The non-contact dancer mechanism of claim 1, further comprising a displacement sensor for determining a displacement of the variable position web support plenum on the guide rail.

4. The non-contact dancer mechanism of claim 3, wherein the displacement sensor is operatively associated with the support plenum counterbalance.

5. The non-contact dancer mechanism of claim 1, wherein the guide rail is vertically oriented.

6. The non-contact dancer mechanism of claim 1, wherein the variable position web support plenum redirects the web of brittle material from a first pathway to a second pathway non-parallel with the first pathway when the web of brittle material is drawn over the arcuate outer surface of the variable position web support plenum.

7. An apparatus for isolating upstream and downstream processes from one another while processing a web of brittle material, the apparatus comprising:
    a fixed position web support plenum having an arcuate outer surface with a plurality of fluid vents for emitting fluid;
    a variable position web support plenum adjustably positioned on a guide rail and mechanically coupled to a support plenum counterbalance, the variable position web support plenum having an arcuate outer surface with a plurality of fluid vents for emitting fluid;
    a web threading support adjustably positioned relative to the arcuate outer surface of the fixed position web support plenum, wherein the web threading support comprises an air flotation table, a web support shuttle, and a web support surface with a plurality of fluid vents, wherein at least a portion of the web support surface has a radius of curvature which is complimentary to a radius of curvature of the arcuate outer surface of the fixed position web support plenum and the web support shuttle is positionable with respect to the arcuate outer surface of the fixed position web support plenum, wherein:
    the fixed position web support plenum redirects the web of brittle material from an initial pathway to a first pathway along which the variable position web support plenum is positioned as the web of brittle material is supported over and spaced apart from the arcuate outer surface of the fixed position web support plenum;
    the variable position web support plenum redirects the web of brittle material from the first pathway to a second pathway as the web of brittle material is supported over and spaced apart from the arcuate outer surface of the variable position web support plenum; and
    a position of the variable position web support plenum on the guide rail is adjusted based on a process variable of the upstream process, a process variable of the downstream process or process variables of both the upstream process and the downstream process.

8. The apparatus of claim 7, wherein the support plenum counterbalance comprises an air cylinder.

9. The apparatus of claim 7, further comprising a displacement sensor for determining a displacement of the variable position web support plenum on the guide rail.

10. The apparatus of claim 9, wherein the displacement sensor is operatively associated with the support plenum counterbalance.

11. The apparatus of claim 7, wherein the guide rail is vertically oriented.

* * * * *